United States Patent [19]

Yamamoto

[11] Patent Number: 5,473,962

[45] Date of Patent: Dec. 12, 1995

[54] BICYCLE HANGER STRUCTURE

[76] Inventor: Teiji Yamamoto, 4-14, 3-chome, Tannan, Matsubara Osaka, Japan

[21] Appl. No.: 217,994

[22] Filed: Mar. 28, 1994

[51] Int. Cl.$^6$ .................................. G05G 1/14; F16C 9/02
[52] U.S. Cl. .................................. 74/594.1; 384/545
[58] Field of Search .................................. 384/458, 545; 280/259; 74/594.1

[56] References Cited

U.S. PATENT DOCUMENTS 4,605,321  8/1986  Brandenstein et al. ............. 384/545 X
5,181,437  1/1993  Chi ........................................ 74/594.1

FOREIGN PATENT DOCUMENTS 382976  2/1908  France ................................... 384/458

*Primary Examiner*—Richard M. Lorence
*Attorney, Agent, or Firm*—Moonray Kojima

[57] ABSTRACT

In the bicycle hanger structure of the invention, a slope such as taper surface or spherical surface formed at one end side of a sleeve of a crankshaft unit is adjusted to a corresponding slope of a hanger, and the other end side is screwed and fixed in the corresponding hanger, so as to be screwed to the hanger only at one side. As a result, effects of deformation of female threads due to thermal deformation of right and left lugs of the hanger do not act on the rotation condition of the crankshaft, and one or both of processing of female threads on the right and left lugs of the hanger may be omitted, and screwing is required only in one position for mounting the crankshaft and the assembling of crankshaft is easy and working efficiency is enhanced, thereby obtaining a bicycle hanger structure not spoiling the rotation condition of the crankshaft.

4 Claims, 7 Drawing Sheets

PRIOR ART

BICYCLE HANGER STRUCTURE

DETAILED DESCRIPTION OF THE INVENTION

1. [Industrial Field of Utilization]

The present invention relates to a bicycle hanger structure for mounting an assembled crankshaft unit on a hanger of bicycle.

2. [Prior Art]

FIG. 1 shows a hanger of bicycle, and a hanger 10 is formed on a frame 12 of a bicycle 11, in which a crankshaft 15 for fixing a gear crank 14 possessing pedals 13 is rotatably inserted.

FIG. 2 shows a conventional hanger structure, in which the hanger 10 is formed of a separate member from the frame 12, and is welded to the frame 12, and female threads 17, 17 are cut in the inner circumference of right and left lugs 16, 16 penetrating the hanger 10 in the lateral direction, and these female threads 17, 17 are engaged with male threads 19,19 cut in the outer circumference of right and left sockets 18, 18, and by interposing balls 22, 22 between right and left ball holders 20, 20 of the crankshaft 15 and ball holders 21, 21 of right and left sockets 18, 18, the crankshaft 15 is borne on the right and left sockets 18, 18. Numeral 23 in the diagram is a hanger fixing nut.

In such hanger structure, since the hanger 10 is fixed to the frame 12 by welding, the shape (roundness) and center line of the right and left lugs 16, 16 may be deviated due to welding heat, and fitting of the right and left sockets 18,18 to be screwed to the right and left lugs 16, 16 may be poor, and if the sockets 18, 18 are screwed, the center line remains deviated laterally, and smooth rotation of the bearing may not be obtained.

Furthermore, when assembling the crankshaft 15 into the hanger 10, it is necessary to screw two right and left sockets 18, 18, and this job is complicated, and if the right and left sockets 18, 18 are deformed by hardening to be low in roundness, together with the deviation of shape and center line of the right and left lugs 16, 16, the bearing center of the crankshaft 15 is further deviated, and the rotation of the crankshaft 15 becomes worse.

[OBJECTS]

The invention therefore presents a bicycle hanger structure in which a slope such as taper surface or spherical surface formed at one end side of a sleeve of a crankshaft unit is adjusted to a corresponding slope of a hanger, and the other end side is screwed and fixed in the corresponding hanger, so as to be screwed to the hanger only at one side.

It is a first object of the invention to present a bicycle hanger structure in which effects of deformation of female threads accompanying thermal deformation of right and left lugs of the hanger do not act on the rotation condition of the crankshaft.

It is a second object of the invention to present a bicycle hanger structure in which processing of female threads in right and left lugs of the hanger can be eliminated in one side or both sides.

It is a third object of the invention to present a bicycle hanger structure in which assembling of crankshaft is easy and working efficiency is enhanced by screwing only in one position for mounting the crankshaft.

It is a fourth object of the invention to present a bicycle hanger structure in which an assembled crankshaft unit is automatically aligned when mounted, effects of thermal deformation of the hanger do not act on the crankshaft unit, and the smooth rotation of the crankshaft is directly transmitted and maintained in the hanger.

It is a fifth object of the invention to present a bicycle hanger structure in which the slope is formed on the sleeve of the crankshaft unit so that the diameter of ball holders in the slope side sleeve is formed widely, so that large balls can be used in the bearing, and therefore the bearing is firm and stable, so that a smooth rotation is obtained.

It is a sixth object of the invention to present a bicycle hanger structure in which the above objects are achieved by forming the slope in a taper or spherical surface.

[EMBODIMENTS]

Figure 1:
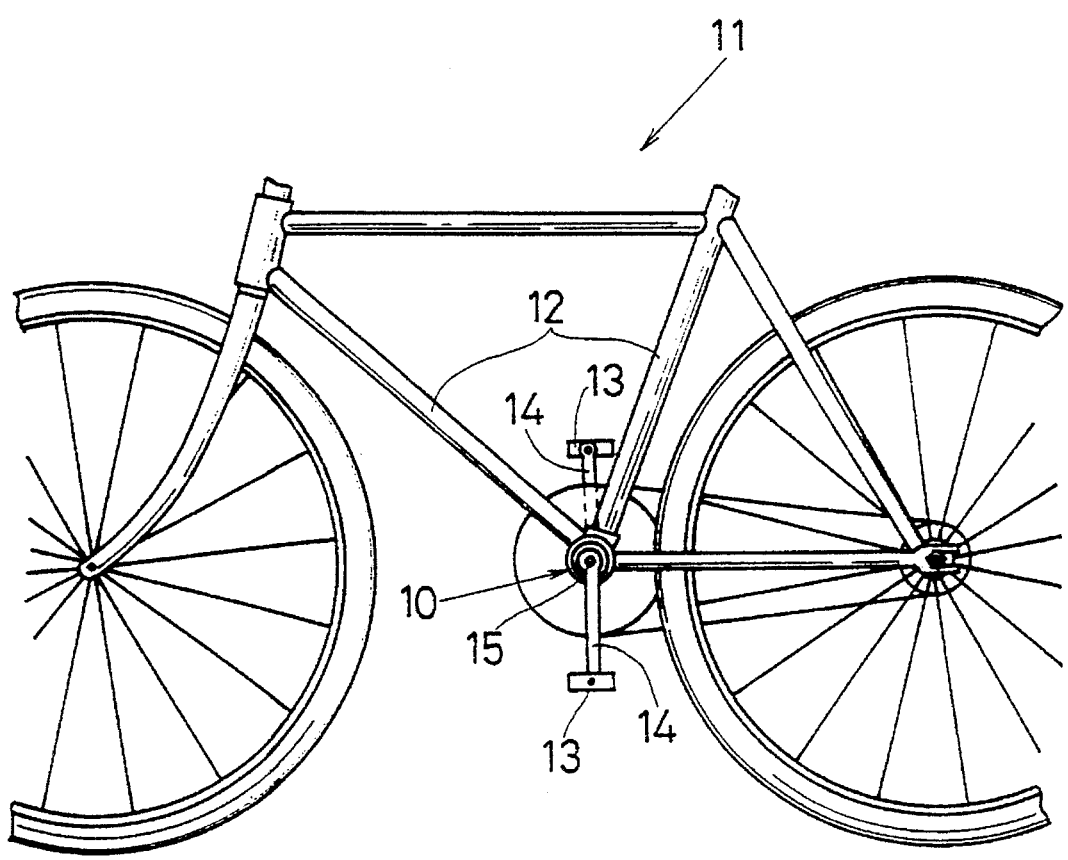
FIG. 1 is a partial side view of a bicycle.

An embodiment of the invention is described below while referring to the drawing.

Figure 2:
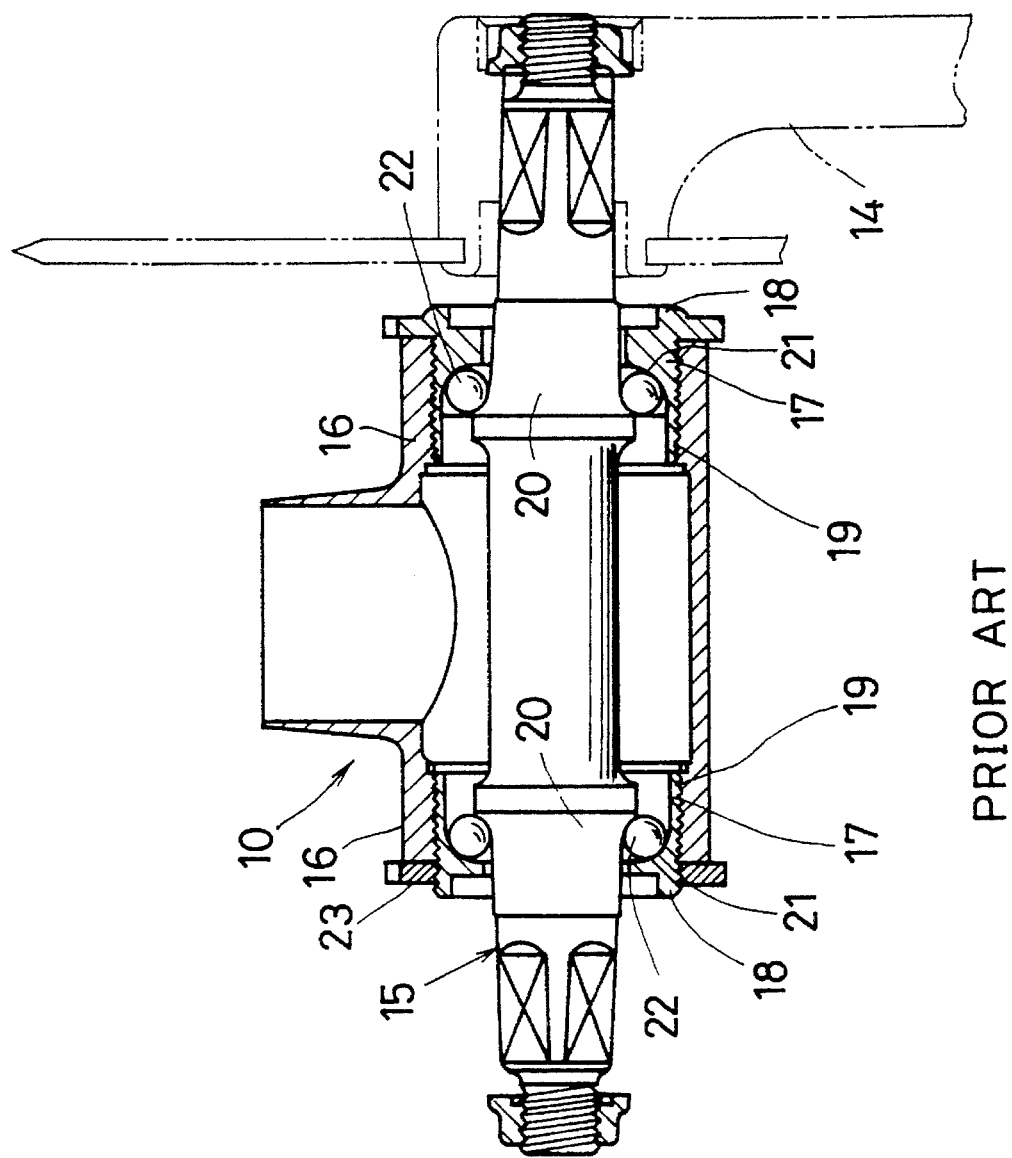
FIG. 2 is a sectional view showing a conventional hanger.
Figure 3:
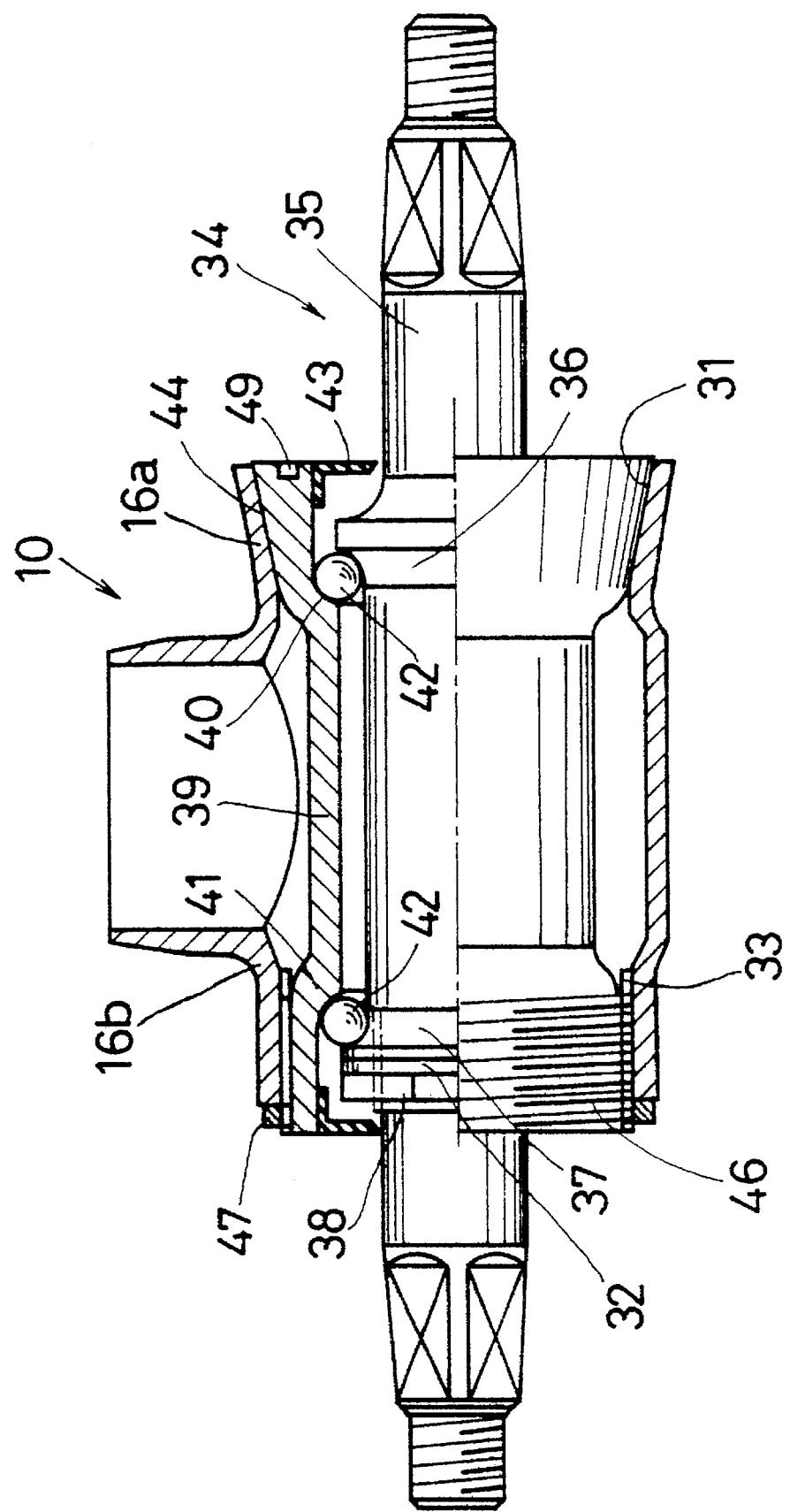
FIG. 3 is a sectional view showing a hanger of the invention.

The drawing shows one embodiment of the invention, and in FIG. 3, the hanger 10 is the hanger 10 of the bicycle 11 shown in FIG. 1 and FIG. 2, and lugs 16a, 16b are formed at the right and left sides thereof.

In the inner circumference of one lug 16a, a taper (slope) 31 becoming narrower from outside to inside is formed.

In the inner circumference of the other lug 16b, female threads 33 are cut, in which a crankshaft unit 34 described below is fitted.

The crankshaft unit 34 is composed as follows. That is, a crankshaft 35 possesses a ball holder 36 integrally formed at one side, and a ring-shaped ball holder 37 screwed at a position distant by a specific interval, and at the outside of the ring-shaped ball holder 37, a fixing nut 38 for fixing the ball holder 37 is screwed through a spring washer 32.

The crankshaft 35 is borne in a sleeve 39, and ball holders 40, 41 are formed in the sleeve 39 in correspondence to the ball holders 36, 37, and by interposing balls 42 . . . among the ball holders 36, 37, 40, 41, the crankshaft 35 is borne and unitized in the sleeve 39. Numerals 43, 43 in the drawing are seals.

In the outer circumference at one end side of the sleeve 39 of the crankshaft unit 34, a taper (slope) 44 becoming narrower from outside to inside is formed, and the taper 31 formed in the inner circumference of one lug 16a of the hanger 10 is formed so as to match in the slope angle with the taper 44 of the sleeve 39.

At the other end side of the sleeve 39, male threads to be engaged with the female threads 33 formed in the inner circumference of the other lug 16b of the hanger 10 are formed, and a fixing nut 47 is set in the male threads 46.

On the end surface of the taper 44 side of the sleeve 39, spanner holes 49 are formed at uniform intervals on the circumference.

To assemble thus composed crankshaft unit 34 on the lugs 16a, 16b of the hanger 10, the male threads 46 forming side of the crankshaft unit 34 is inserted into the other lug 16b side from the lug 16a side, the male threads 46 are engaged with the female threads 33 of the other lug 16b, and further fitting into the spanner holes 49 by using a proper spanner. Afterwards, the fixing nut 47 is set on the male threads 46 projecting from the other lug 16b. When the crankshaft unit 34 is assembled in this manner, since the taper 44 of the sleeve 39 and the taper 31 of the lug 16a are matched in the slope angle, they are fixed by wedge effect, and therefore screwing is required only at the other lug 16b side, so that the assembling process is simple and easy.

Thread cutting of the hanger 10 is required only in one position of the other lug 16b, and processing of one taper 31 is easier than thread cutting, and hence the processing manpower of the hanger 10 is saved, and even if the hanger 10 is thermally deformed by fusion, since the tapers 31, 44 are matched, it is aligned automatically, and hence the crankshaft unit 34 is free from effects of deformation of the hanger 10, and moreover together with the unitization of the crankshaft 35, the smooth rotation condition of the crankshaft 35 can be directly set and maintained.

In addition, by forming the taper 44 at one side of the sleeve 39 of the crankshaft unit 34, the diameter of the ball holder 40 at the inner side can be formed widely, so that large balls 42 can be used for the bearing, and therefore the bearing is firm and stable, and a favorable rotation of the crankshaft 35 is obtained.

Figure 4:
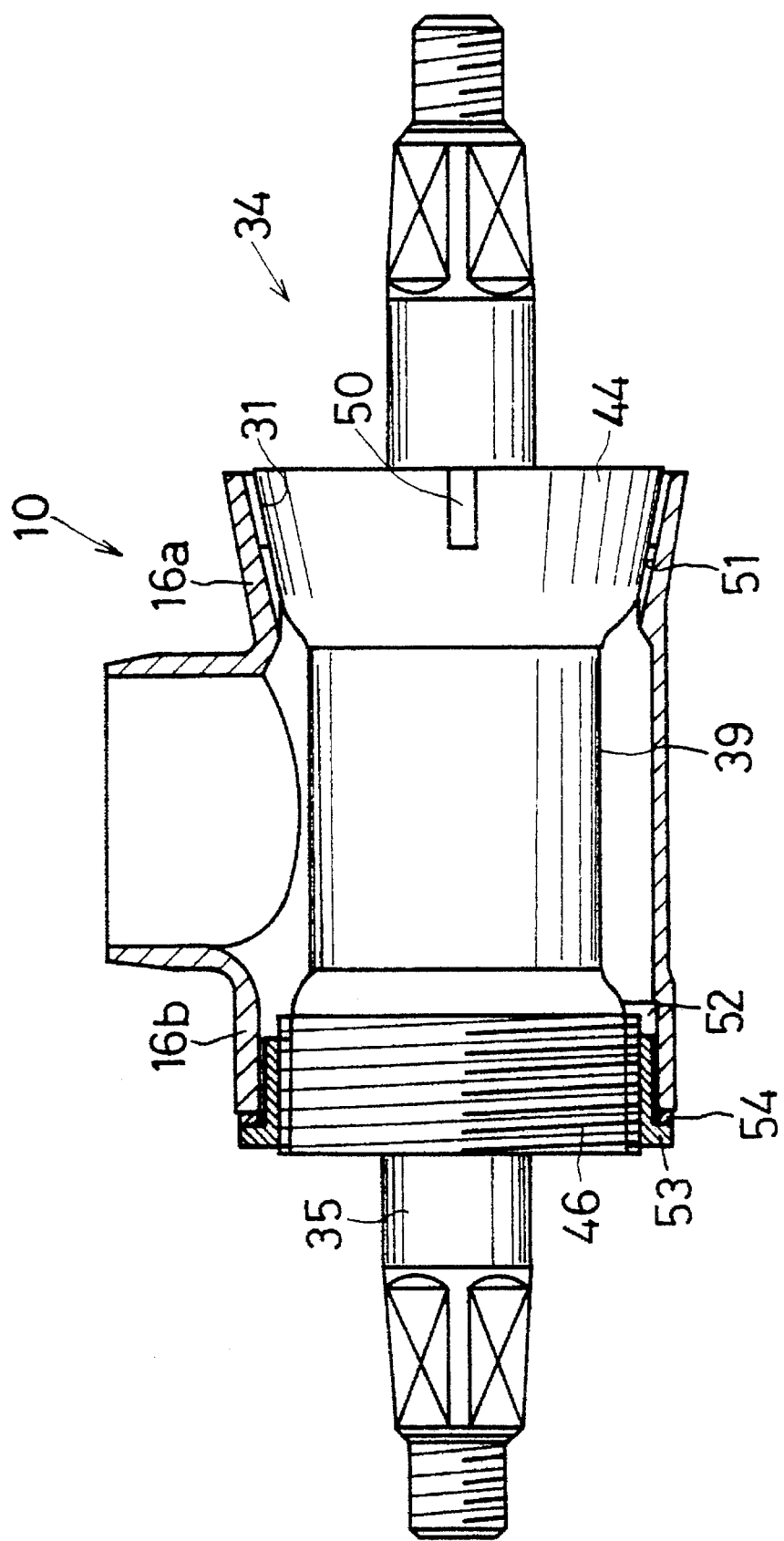
FIG. 4 is a sectional view showing other hanger.

FIG. 4 shows other example, and constituent elements having the same functions as in the constitution explained in FIG. 3 are identified with same reference numerals and their explanations are omitted, and more specifically protrusions 50 for preventing from rotating are formed at four positions equally divided on the circumference of the taper 44 of the sleeve 39 of the crankshaft unit 34, and grooves 51 to be engaged with the protrusions 50 are formed on the circumference of the taper 31 of the corresponding lug 16a, and by engagement of them, rotation preventive mechanism of the sleeve 39 is securely composed.

In the inner circumference of the other lug 16b of the hanger 10, female threads are not cut, but free holes 52 are formed, and the free holes 52 are formed in a size for inserting the outer circumference of flanged set nuts 53. Numeral 54 in the diagram is a spring washer.

When thus constituted, the protrusions 50 of the taper 44 of the crankshaft unit 34 are engaged with the grooves 51 of the taper 31 of the lug 16a to prevent from rotating, and the flanged set nuts 53 is screwed into the male threads 46 of the crankshaft unit 34 from the other lug 16b through the spring washer 54, and the crankshaft unit 34 is pulled and fixed to the other lug 16b side.

According to the second embodiment, in addition to the effects of the embodiment shown in FIG. 3, since female threads are not cut in the lugs 16a,16b of the hanger 10, so that the processing manpower is further saved.

Figure 5:
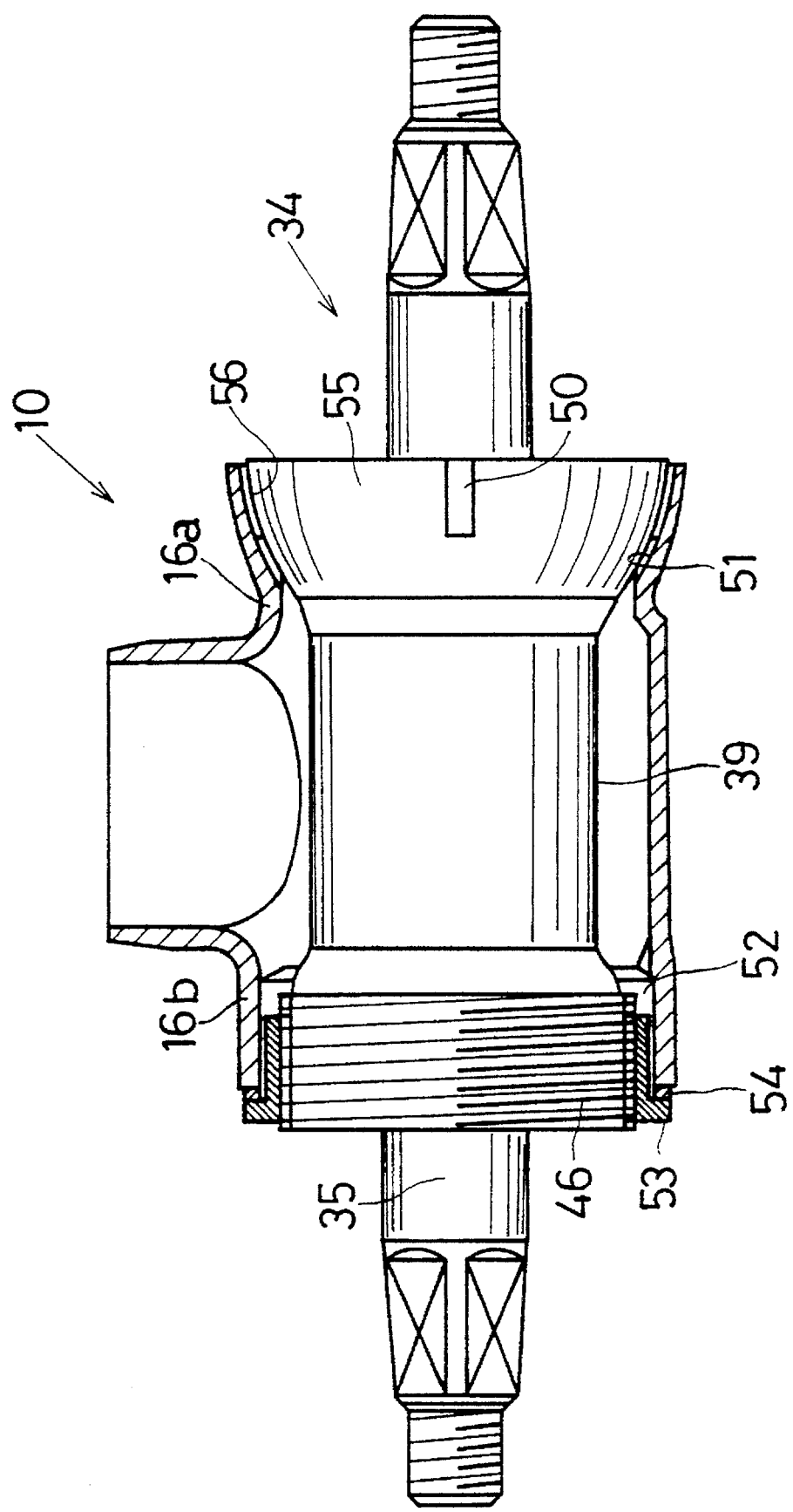
FIG. 5 is a sectional view showing another hanger.

FIG. 5 shows another example, in which a spherical surface 55 is formed, instead of the taper 44 formed in the sleeve 38 in FIG. 4 which is linear in the axial center direction, and the inner circumference of the lug 16a is also formed in a spherical surface 56 to correspond thereto, and only this point is different from the embodiment in FIG. 4. Hence, the other constituent elements having the same functions are identified with same reference numerals and are not explained herein.

In this constitution, too, the same action and effects as in the embodiment shown in FIG. 4 are obtained.

Figure 6:
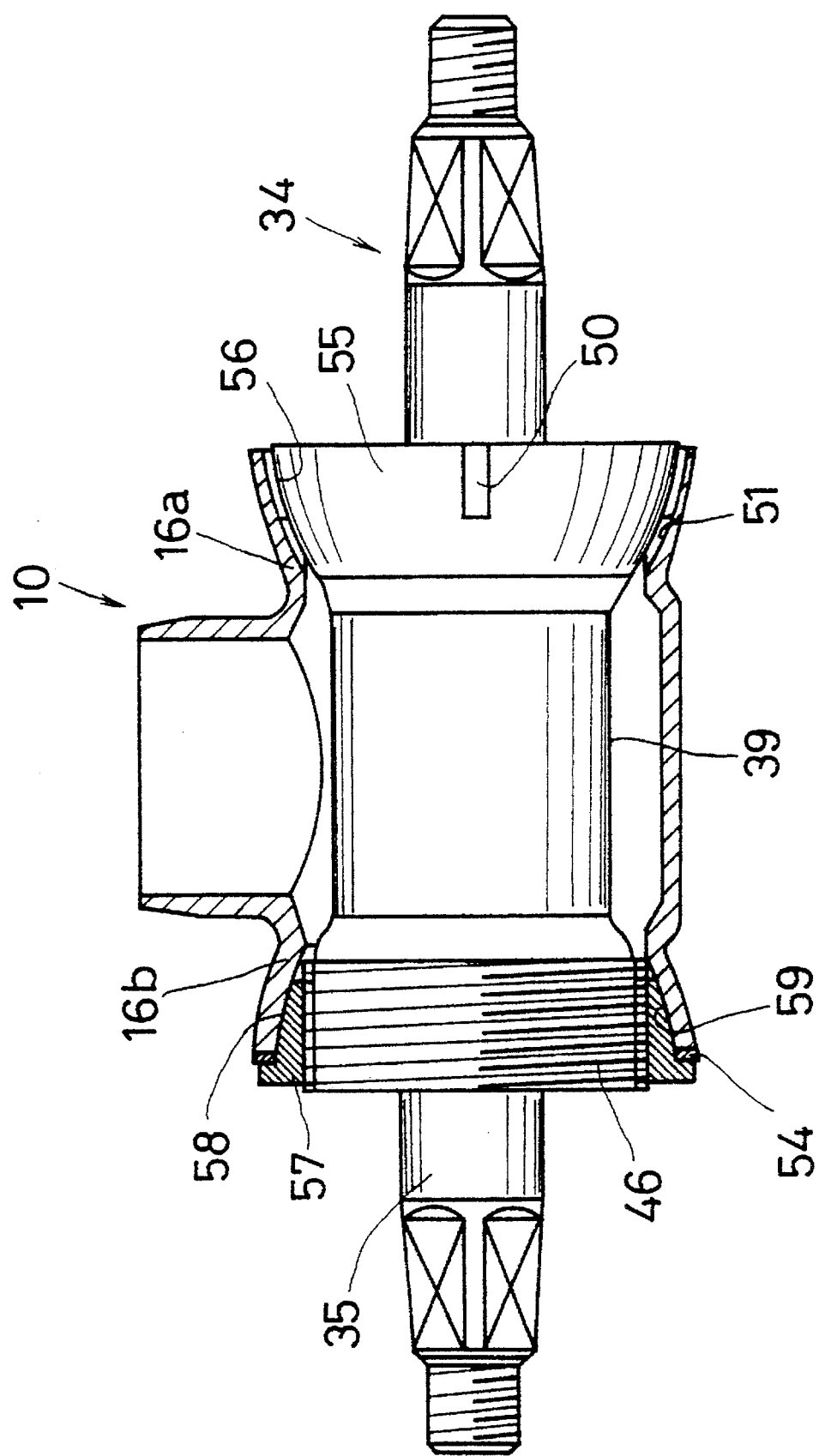
FIG. 6 is a sectional view showing a different hanger.

FIG. 6 shows a different example, in which the outer circumference of the flanged set nuts 57 for screwing the sleeve 39 is also formed in a spherical surface 58, and the inner circumference of the lug 16b is also formed in a spherical surface 59 to correspond thereto, and this is the only difference from the embodiment in FIG. 5.

Hence, the other constituent elements having the same functions are identified with same reference numerals and their explanations are omitted.

In this constitution, since the crankshaft unit 34 is automatically aligned easily by both the spherical surfaces 55, 56 and the other spherical surfaces 58, 59, and the bearing of the crankshaft 35 is not deviated, and a smooth rotation condition is maintained, and other effects are obtained same as in the embodiment shown in FIG. 5.

Figure 7:
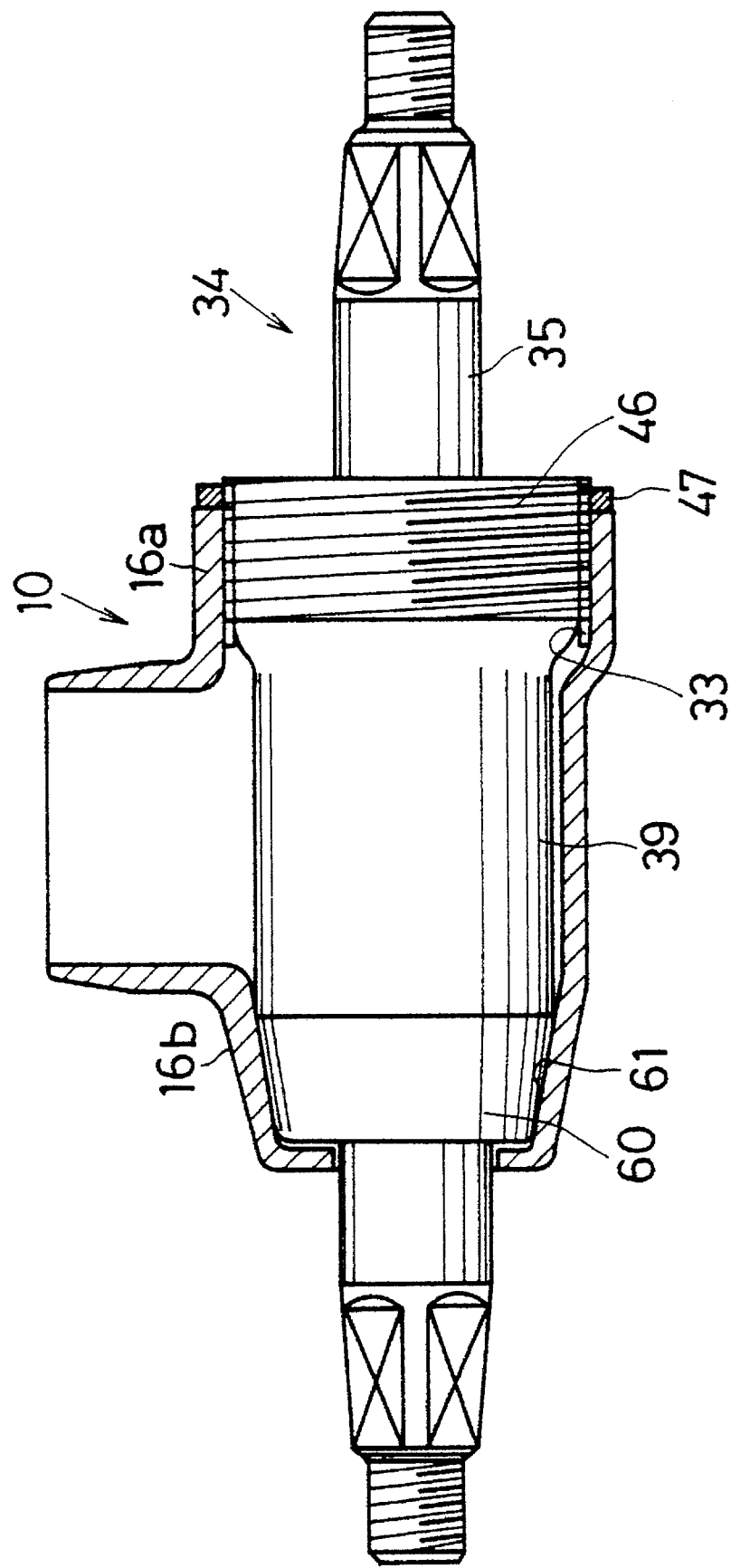
FIG. 7 is a sectional view showing a further different hanger.

FIG. 7 shows a further different example, in which a taper 60 (or a spherical surface) formed at one end side of the sleeve 39 of the crankshaft unit 34 is formed in a shape becoming narrower from inside to outside, and a corresponding taper 61 is formed inside the lug 16b. The other constituent elements having the same functions are identified with the same reference numerals as in FIG. 3, and their explanations are omitted.

In this constitution, too, the same action and effects as in FIG. 3 are obtained.

Meanwhile, in the embodiments shown in FIGS. 4, 5, 6, the rotating preventive means is realized by engagement of the protrusions 50 and grooves 51, but the tapers 31, 34 and spherical surfaces 55, 56 may be formed in a polygonal shape on the circumference, and by the engagement of the polygonal shapes, the rotation preventive means may be formed.

In FIGS. 3 to 7, the slopes may be also formed in reverse direction of inclination.

I claim:
1. In a bicycle hanger structure comprising
a hanger mounted on a frame of a bicycle and comprising a pair of hollow cylindrical lugs disposed on either end of a hollow cylindrical central portion, at least a first lug having an inner sloping surface;
a hollow cylindrical sleeve disposed within a hollow space of said pair of lugs and said central portion of said hanger, said sleeve having a sloping outer surface on a first end thereof and being correspondingly fitted to said sloping inner surface said first lug;
a crankshaft rotatably disposed within the hollow of said cylindrical sleeve; and
threaded means disposed between a second end of said sleeve and a second of said pair of lugs; the improvement comprising
means for preventing rotation of said sleeve comprising a protrusion located on the outer sloping surface of said sleeve and a groove located in the inner surface of said first lug for holding said protrusion.
2. The hanger of claim 1, wherein said first lug has an inner sloping surface which is tapered and has a larger diameter at an end thereof and a smaller diameter toward said central portion, and said outer sloping surface of said sleeve is tapered and has a correspondingly larger diameter at an end thereof and a smaller diameter toward said central portion.

3. The hanger of claim 1, wherein said first lug has an inner sloping surface which is spherical and has a larger diameter at an end thereof and a smaller diameter toward said central portion, and said outer sloping surface of said sleeve is spherical and has a correspondingly larger diameter at an end thereof and a smaller diameter toward said central portion.

4. The hanger of claim 1, wherein said second lug has an inner sloping surface the other lug is spherical and has a larger diameter at an end thereof and a smaller diameter toward said central portion, and said threaded means includes a flanged set nut having an outer sloping surface which is spherical and has a correspondingly larger diameter at an end thereof and a smaller diameter toward said central portion.

* * * * *